Figure 1:
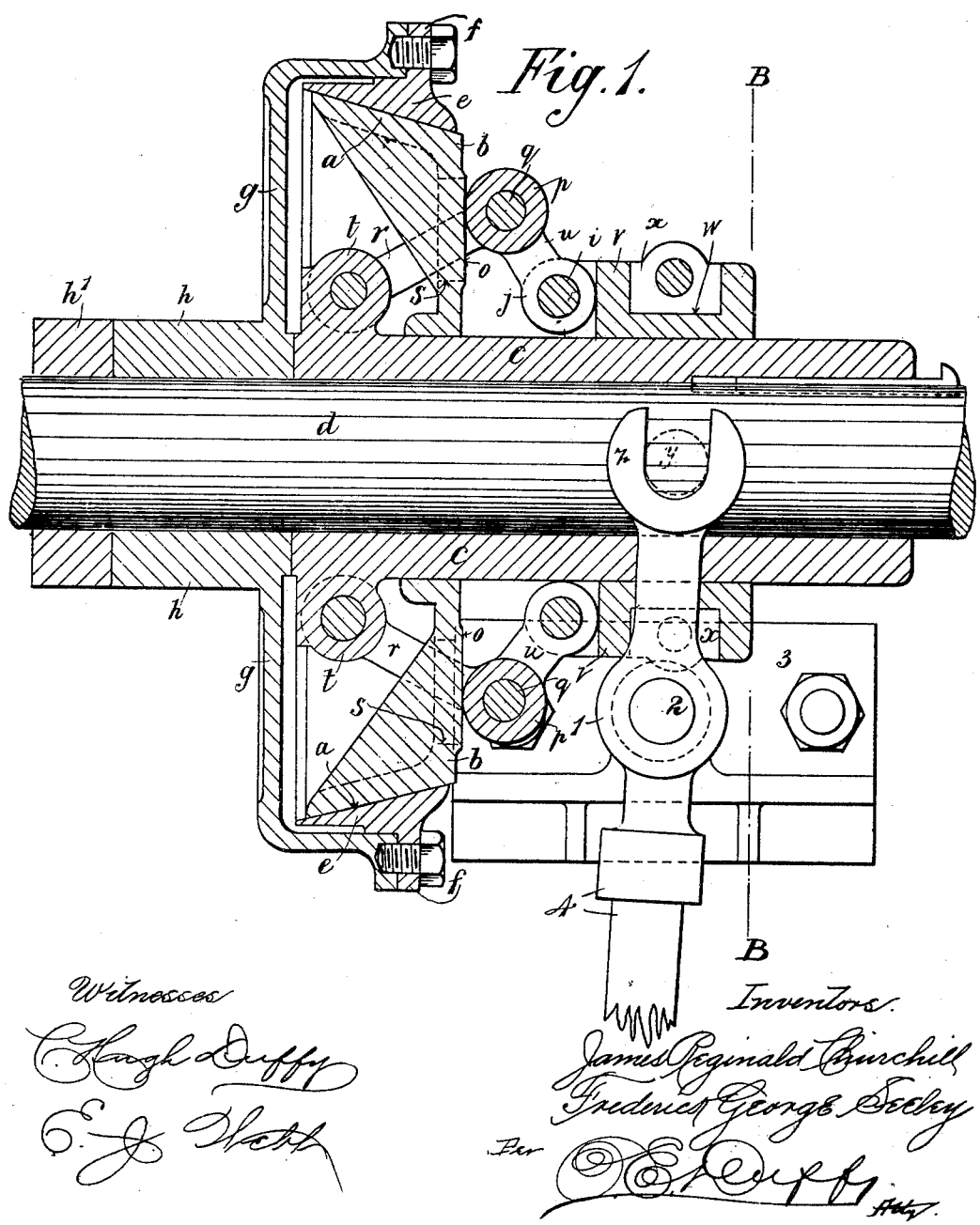

No. 679,414. Patented July 30, 1901.
J. R. CHURCHILL & F. G. SEELEY.
FRICTION CLUTCH.
(Application filed Mar. 16, 1900.)
(No Model.) 9 Sheets—Sheet 1.

Witnesses
Hugh Duffy
E. J. ...

Inventors
James Reginald Churchill
Frederick George Seeley
Per ... Atty.

No. 679,414. Patented July 30, 1901.
J. R. CHURCHILL & F. G. SEELEY.
FRICTION CLUTCH.
(Application filed Mar. 16, 1900.)
(No Model.) 9 Sheets—Sheet 9.

UNITED STATES PATENT OFFICE.

JAMES REGINALD CHURCHILL, OF SHEFFIELD, AND FREDERICK GEORGE SEELEY, OF HATHERSAGE, ENGLAND.

FRICTION-CLUTCH.

SPECIFICATION forming part of Letters Patent No. 679,414, dated July 30, 1901.

Application filed March 16, 1900. Serial No. 8,919. (No model.)

*To all whom it may concern:*

Be it known that we, JAMES REGINALD CHURCHILL, residing at Sheffield, in the county of York, and FREDERICK GEORGE SEELEY, residing at Hathersage, in the county of Derby, England, subjects of the Queen of Great Britain and Ireland, have invented Improvements in Friction-Clutches, of which the following is a specification.

This invention has reference to friction-clutches of the kind wherein two reversely and concentrically arranged friction-cones respectively connected to the two rotary parts to be connected or coupled together are adapted to be pressed into frictional driving connection with each other by one or more springs arranged within the cones and are adapted to be forced out of driving connection with each other against the action of the spring or springs by striking or operating mechanism arranged outside the cones.

Now this invention has reference to improvements in friction-clutches of the kind referred to whereby the putting of the clutch into and out of operation is facilitated.

It also has reference to improved constructions and arrangements of such clutches.

According thereto the movable cone is moved into its inoperative position against the action of the spring or springs by means of antifriction-rollers or equivalent means carried by links or bars that are jointed to the rollers and some of which are jointed to a part of the clutch that does not move endwise, and others to a collar, muff, or like part, (hereinafter called a "muff,") adapted to be moved endwise by suitable means, such as a clutch-operating lever, the arrangement being such that by moving the muff in one direction the antifriction-rollers will be caused to bear against the movable cone or a part in connection therewith and move such cone out of driving connection with the other cone against the action of the spring or springs and bring the links that connect the antifriction-rollers to the muff into positions at right angles to the axis of the clutch, or approximately so, so that they will become locked in place against any action of the spring or springs to force them and the muff endwise in the opposite direction, while leaving the muff and the ends of the links jointed thereto free to be moved in this direction by the clutch-operating lever when it is desired to move the rollers away from the movable cone and permit that cone to be pressed into driving connection with the second cone by the action of the spring or springs.

Clutches according to the present invention can be constructed in various forms.

Figure 2:
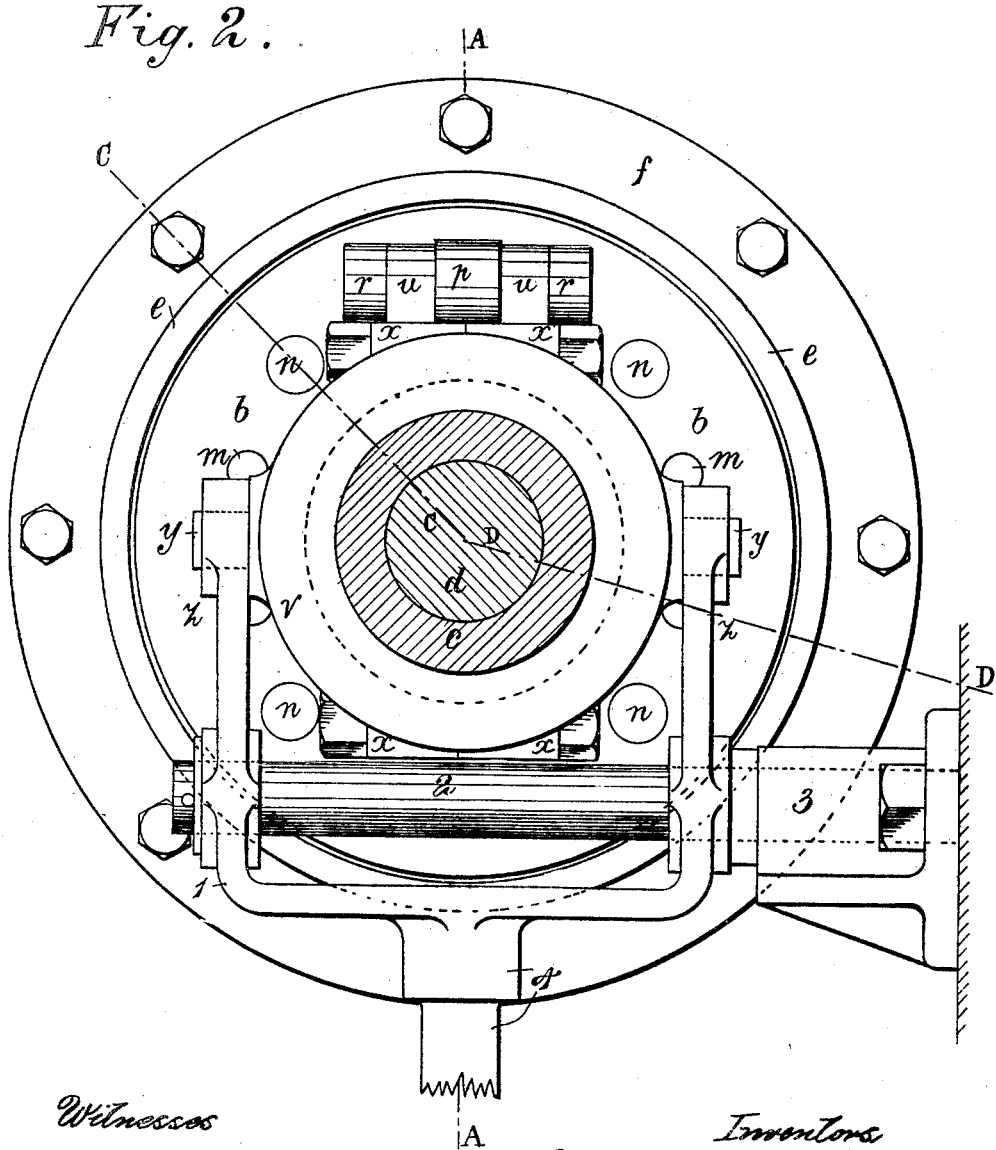
Figure 3:
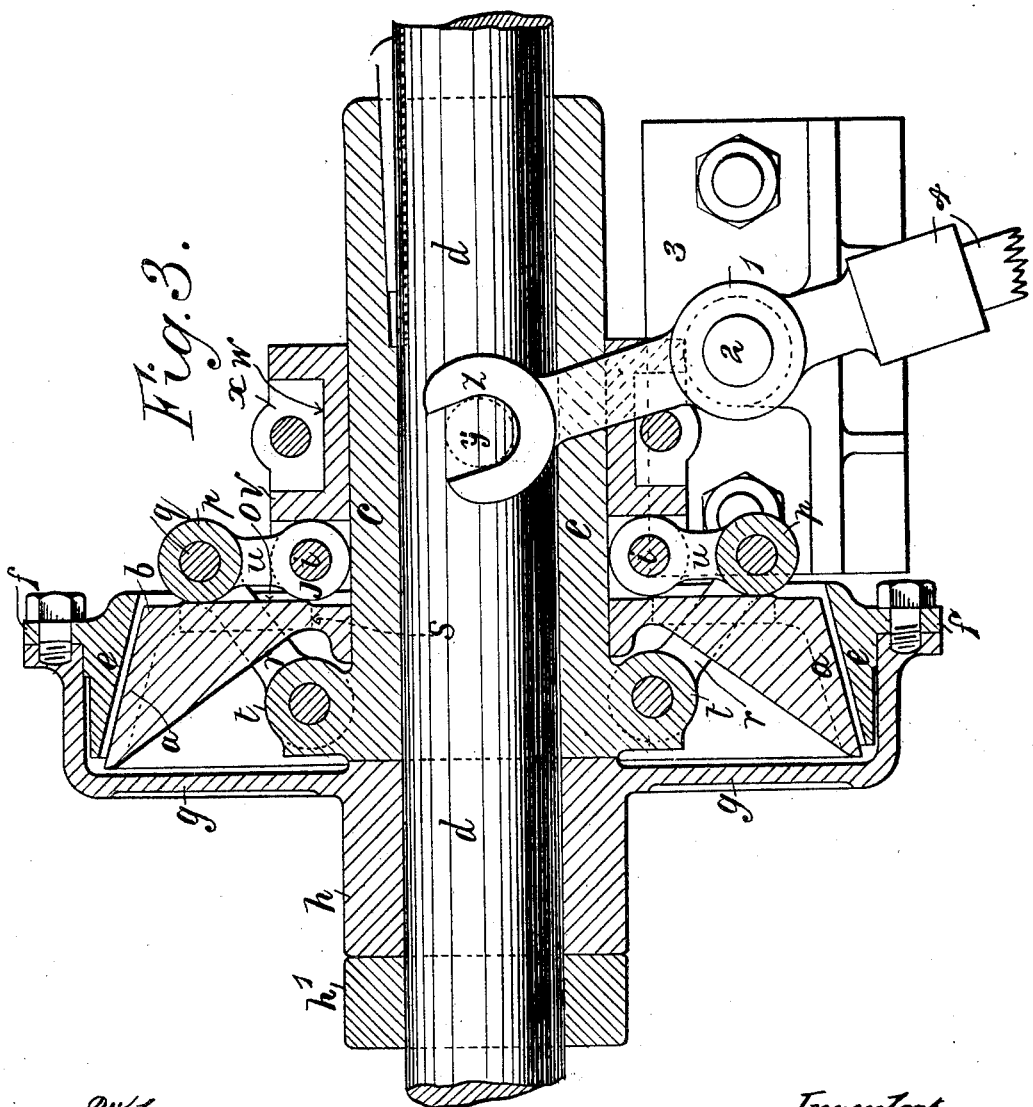
Figure 4:
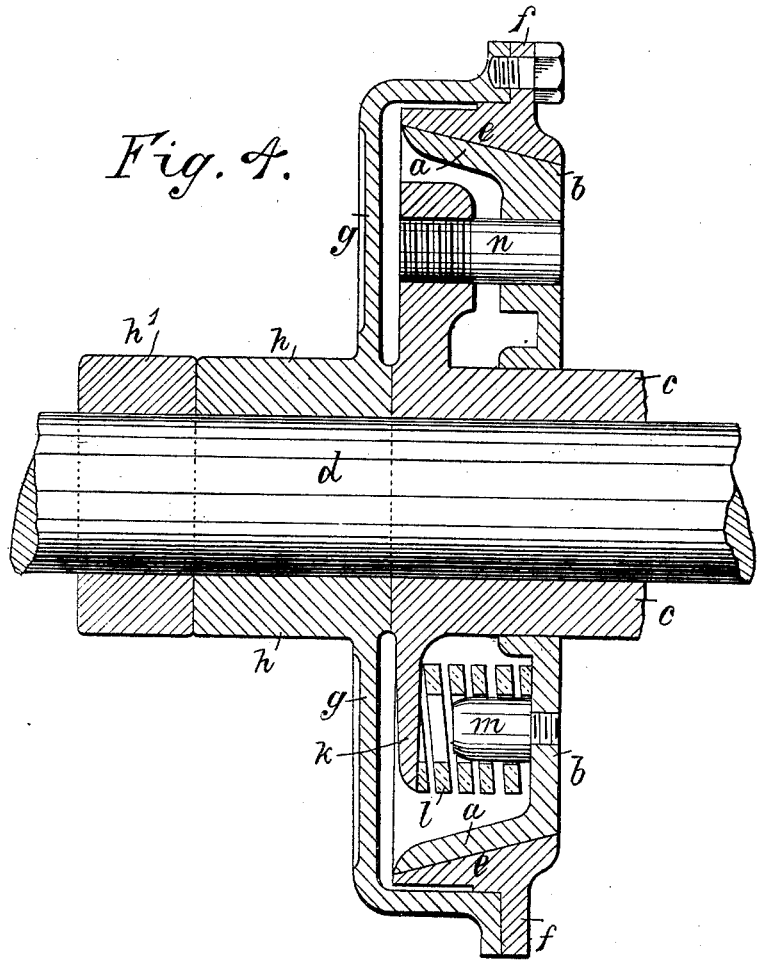
Figure 5:
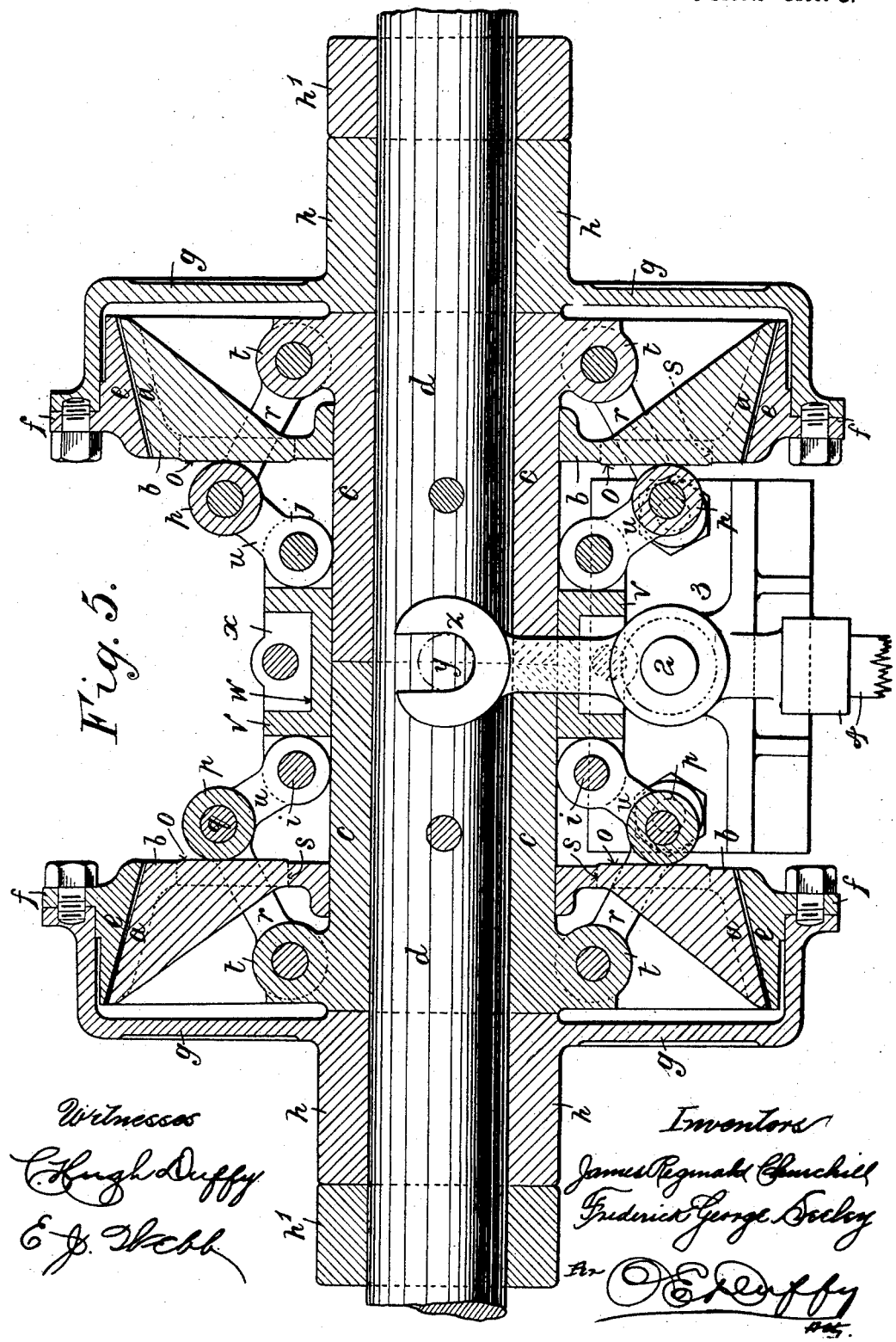
Figure 6:
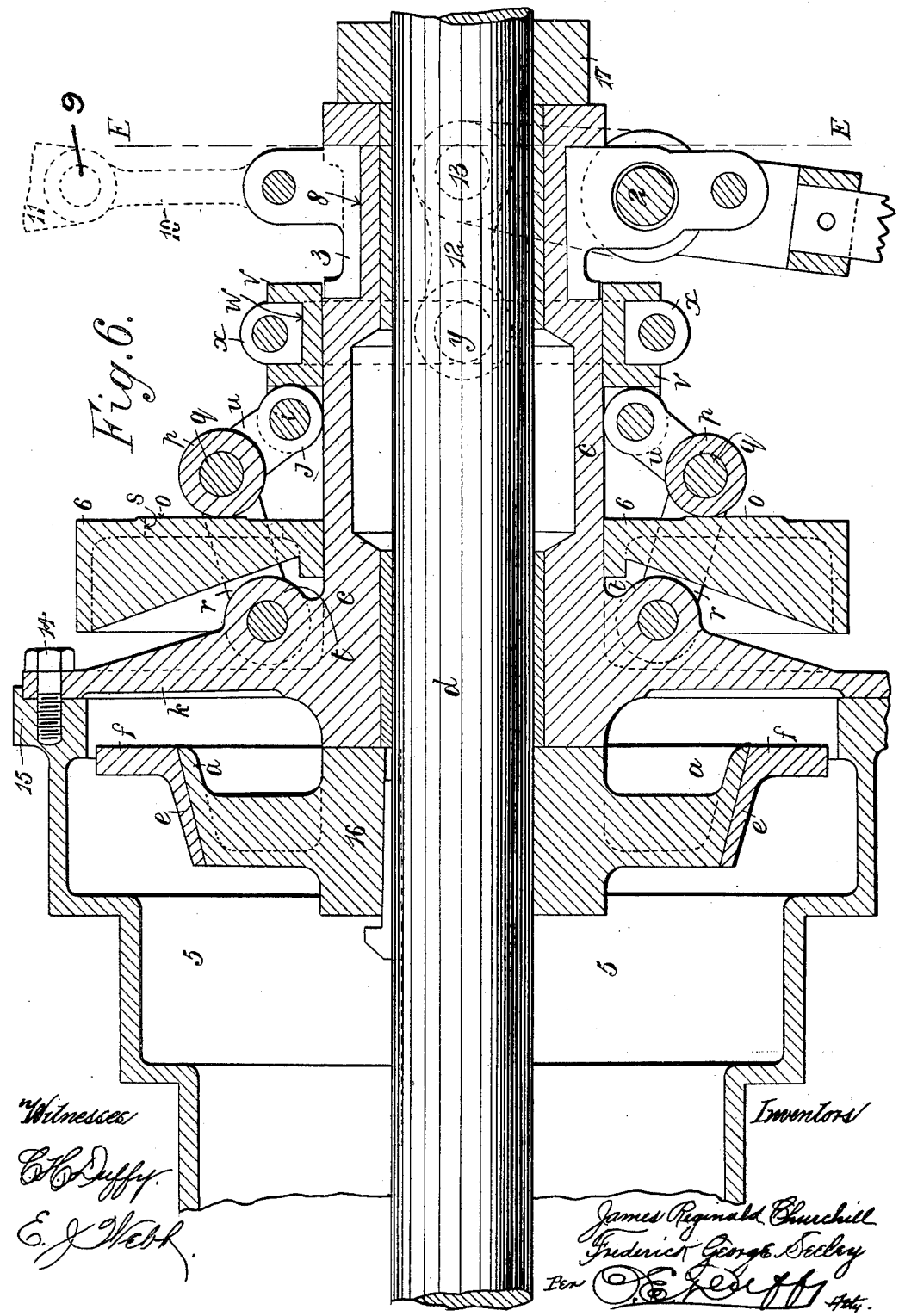
Figure 7:
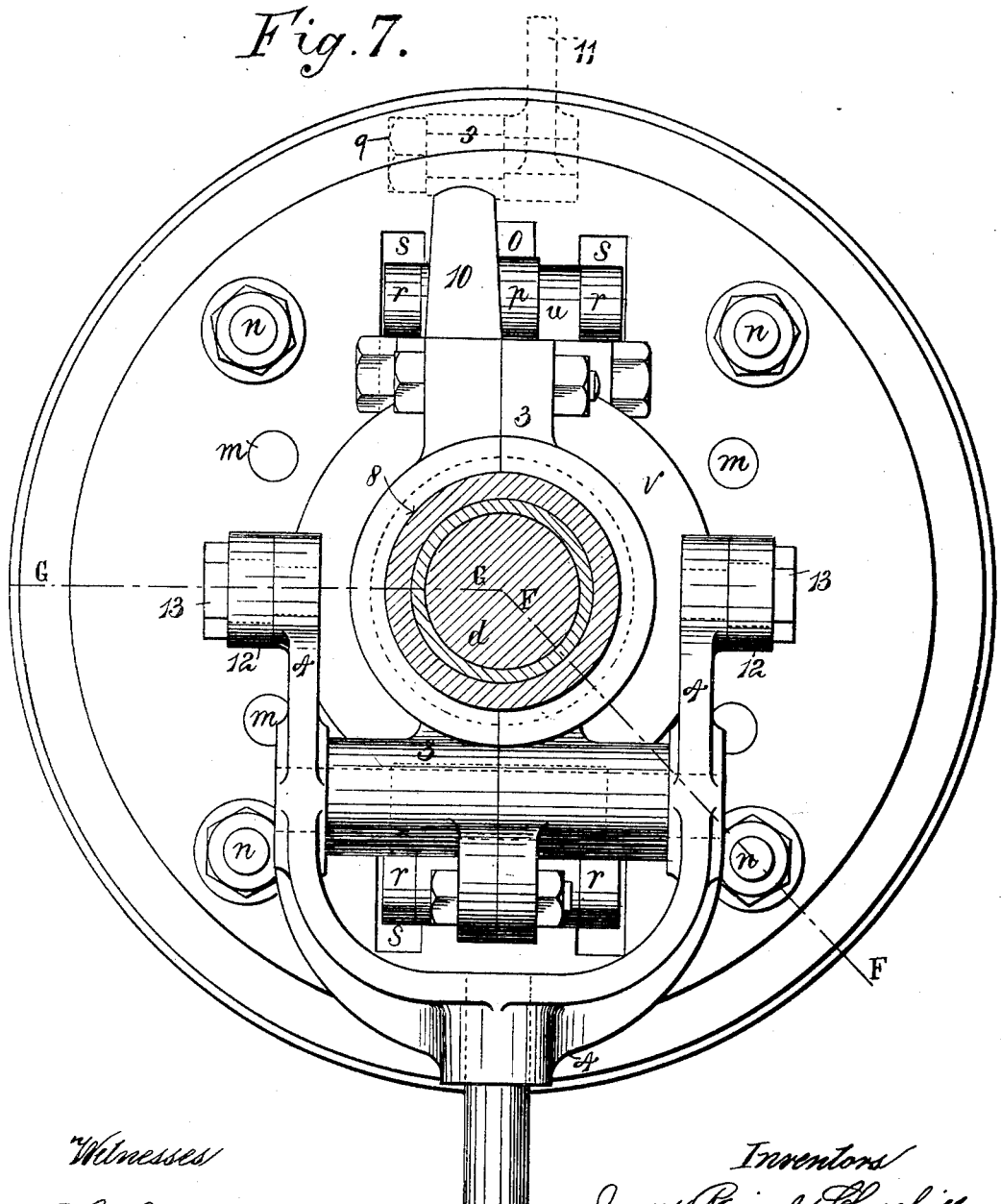
Figure 8:
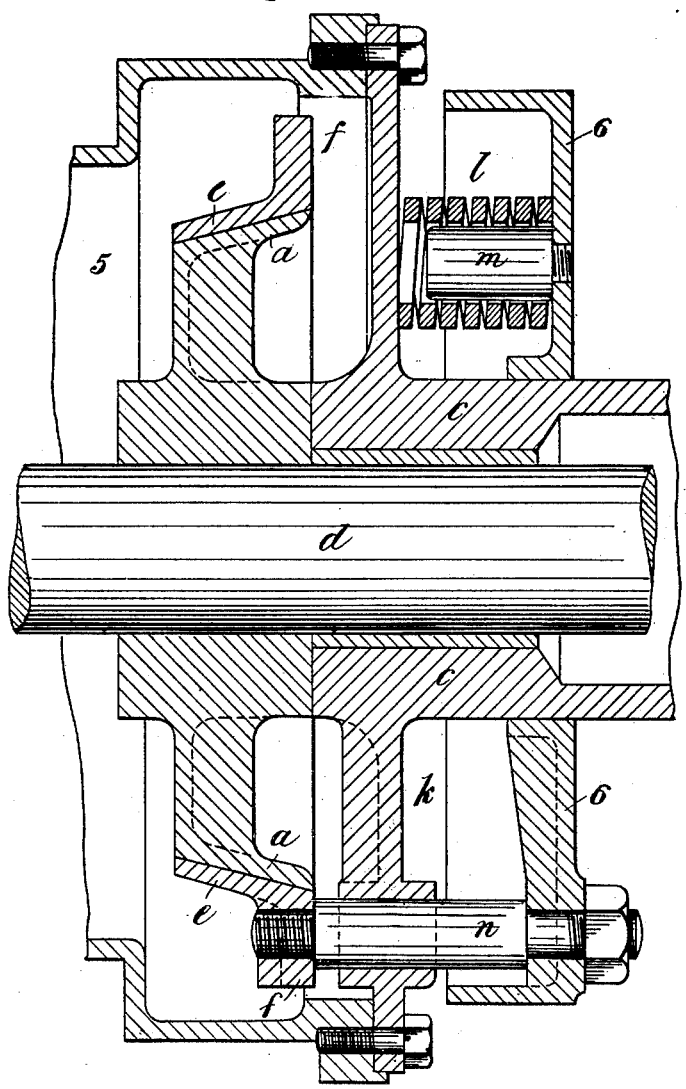
Figure 9:
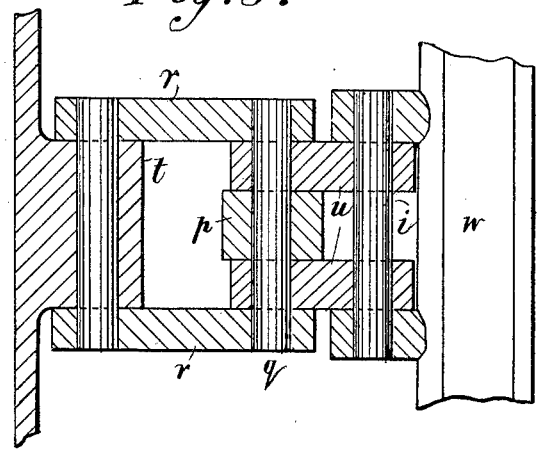

In the accompanying illustrative drawings, Figure 1 is a longitudinal section on the line A A of Fig. 2; and Fig. 2 is a cross-section on the line B B of Fig. 1, showing one construction of friction-clutch according to this invention, the clutch being shown in its "on" position. Fig. 3 is a similar view to Fig. 1, showing the clutch in its "off" position. Fig. 4 is a longitudinal section, partly on the line C C and partly on the line D D of Fig. 2. Fig. 5 is a similar view to Fig. 1, showing a double clutch of the kind shown in Figs. 1 to 4, inclusive. Fig. 6 is a similar view to Fig. 1, showing a further modified construction of clutch combined with a stepped cone-pulley. Fig. 7 is a cross-section on the line E E of Fig. 6. Fig. 8 is a partial longitudinal section, partly on the line F F and partly on the line G G of Fig. 7. Fig. 9 is a detail view showing part of a sleeve and muff with connecting-links and antifriction-roller.

In the construction of friction-clutch shown in Figs. 1 to 4, inclusive, the inner cone $a$ is formed at one end with a disk $b$ and is mounted to move endwise upon a sleeve $c$, that is fixed to a rotary shaft $d$. The outer cone $e$ is flanged at $f$ and fixed to a wheel or drum $g$ or equivalent part having a boss $h$ mounted to rotate freely around the said shaft between the adjacent end of the sleeve and a collar $h'$ fixed to the shaft $d$. Between the disk portion $b$ of the cone $a$ and a flange $k$, Fig. 4, formed on the inner end of the sleeve $c$, are arranged coiled springs $l$, that are in a state of compression and tend to force the inner cone $a$ toward and against the outer cone $e$, the said springs being preferably held in position by pins or pegs $m$, that may be carried either by the disk portion $b$ of the inner cone $a$ or by the flange $k$ on the sleeve

*c*. The cone *a* and the flange *k* are connected by two driving-pins *n*, arranged diametrically opposite each other, with their axes parallel to the axis of the rotary shaft *d*. If desired, three or more driving-pins *n* can be used. On the outer side of the disk portion *b* of the inner cone *a* are two diametrically-arranged roller-paths *o*, against which act two antifriction-rollers *p*, each of which is mounted on a pin *q*, Figs. 1 and 9, that is journaled in the outer ends of a pair of links *r*, that extend through slots or openings *s* in the disk portion *b* of the inner cone *a* and are jointed to a boss *t*, or it may be to separate bosses on the sleeve *c* within the cone *a*, the said pin *q* being also journaled in a bifurcated link, or, as shown, in a pair of links *u*, that is or are jointed by a pin *i'* to lugs *j* on a muff *v*, arranged to slide endwise on the sleeve *c*. The arrangement is such that on moving the muff *v* from the cone *a* the latter is left free to be forced into contact with the cone *e* by the springs *l*, and upon moving the muff toward the cone *a* and into the position shown in Fig. 3 the antifriction-rollers *p* will act against the roller-paths *o* on the disk portion *b* of such cone and force the cone against the action of the springs *l* out of driving connection with the outer cone *e*, the links *u* being finally brought into position at right angles or approximately at right angles to the shaft *d*, in which they will be automatically held against the action of the springs, which will then be inoperative to move such links. The muff *v* is formed with an external annular groove *w*, that is fitted with a strap *x*, provided with diametrically-arranged pins *y*, Figs. 1 and 2, adapted to be engaged by the forked ends of two arms *z*, connected to or forming part of a clutch-operating lever. In the example now being described the two arms *z* form the bifurcated end of a lever 1, that is journaled on a pin 2, fixed in a stationary bracket 3, and the other arm 4 of which, formed with a socket, is provided with a handle by which the lever, muff, and attached parts can be operated.

In the modified construction of clutch shown in Fig. 5 there are two clutches of the kind just described mounted upon a common shaft *d*, with the disk portions *b* of the two inner cones *a* facing each other and the antifriction-rollers *p* of the two clutches connected by their carrying-links *u* to an endwise-movable muff *v* of the kind described arranged between and common to the two clutches. In this case when the muff is in its mid-position each of the cones *a* is out of driving connection with its corresponding cone *e*, and when the said muff *v* is moved in either direction from such mid-position the cone *a*, toward which it is moved, is pressed farther away from its cone *e*, while the other cone *a* is left free to be pressed into driving connection with its cone *e* by the corresponding springs *l*, Fig. 4. This construction of double clutch is specially suitable for motorcars.

In the modified construction of clutch shown in Figs. 6, 7, and 8, which is suitable for use with a stepped cone-pulley 5 of a machine, the inner cone *a* is fixed to a rotary driving-shaft *d*, and the outer reversely-arranged cone *e* is fixed to one end of several driving-pins *n*, (four are shown,) that extend through a flange *k* on the sleeve *c*, Fig. 8, and are fixed at their other ends to an annular plate 6, mounted to slide endwise on the said sleeve *c*. Between the flange *k* and the annular plate 6 are coiled springs *l* in a state of compression, these springs, which may be held in place by pins or pegs *m*, carried by one of the two parts between which they are arranged, tending to force the outer cone *e* onto the inner one *a*. Outside the annular plate 6 are antifriction-rollers *p*, carried by links *u r* in the manner hereinbefore described, the pairs of links *r* corresponding to each roller *p* extending through slots or openings *s* in the annular plate 6 (see Fig. 6) and being jointed to a boss or bosses *t* on the sleeve *c*, and the other link or pair of links *u*, connected to each roller *p*, being jointed to an endwise-movable muff *v*, adapted to be moved in either direction on the sleeve *c* by a lever 4, pivoted to a suitable fixed support. In the example the said lever is pivoted to a bracket 3, mounted on a recessed portion 8 of the sleeve *c* and prevented from rotating thereon by a bolt 9, that passes through an eye in an arm 10 of the bracket 3 and through an eye in a fixed bracket or lug 11. The lever 4 acts on the muff *v* conveniently through a strap *x*, encircling the muff and provided with pins *y*, Fig. 6, adapted to be operated by the lever 4 through links 12, connected to the said pins *y* and to pins 13 on the lever 4. The flange *k* on the sleeve *c* is formed at its outer portion with holes or is otherwise adapted to be fixed, as by set-screws 14 or bolts, to a flange 15 on the cone-pulley 5 or other device to be driven through the clutch. Endwise movement of the sleeve *c* on the driving-shaft *d* is prevented in one direction by the boss 16 of the cone *a* and in the opposite direction by a collar 17 fixed on the shaft.

In each arrangement it will be seen that the combination and juxtaposition of the cones and of the parts to which they are connected are such that the springs *l* instead of tending to force the driving and driven portions of the clutch endwise in the same direction along the shaft or shafts carrying them, as heretofore usual in other types of cone-clutches, act to draw the said two portions of the clutch together, the roller-gear hereinbefore described acting to move the two cones apart against the action of such springs.

What we claim is—

1. In a friction-clutch, the combination with the driving and driven portions thereof and one or more springs tending to move the said two portions toward one another, of disengaging gear comprising antifrictional rollers arranged to move transversely and longitudinally of the clutch and to act against one of said portions and press it away from the other against the resistance of the spring or springs, a muff mounted to move endwise in relation to said two clutch portions, links jointed to and carrying said rollers, some of said links extending through the movable part of the clutch against which said rollers act and jointed to a part of the clutch that does not move endwise and others to said muff, and means for moving said muff endwise substantially as described.

2. A friction-clutch comprising two rotary friction-cones arranged one inside the other, separate rotary parts to which said cones are respectively connected so that one cone is fixed in an endwise direction and the other is capable of moving endwise, one or more springs arranged within said clutch and acting to force the endwise-movable cone against the other cone, an endwise-movable muff, driving-pins located within the cones and connecting the rotary driving part with the endwise-movable cone, an abutment device connected to the movable cone, movable bodies adapted to be pressed against said abutment device, sets of links carrying said movable bodies, some of said links being jointed to a part of the clutch that is not endwise movable and others to said muff, and means for moving said muff endwise, substantially as described.

3. In a friction-clutch, the combination with two rotary friction-cones one of which is fixed endwise and the other has a constant tendency to move toward the other, of disengaging mechanism comprising movable bodies adapted to press the movable cone away from the fixed one, a muff mounted to move endwise in relation to said cones, links jointed at one end to said movable bodies and at the other end to a part of the clutch that is not movable endwise, links jointed at one end to said movable bodies and at the other end to said muff, and means for moving said muff endwise, substantially as described.

4. In a friction-clutch, the combination with friction-cones arranged one inside the other and carried by the respective parts to be coupled, and springs acting to press one cone against the other, of a muff arranged to move endwise of said clutch, antifriction-rollers arranged to work against a part connected to the endwise-movable cone, sets of links jointed to said rollers and some of which are jointed to a part of the clutch that is fixed in an endwise direction and others to said muff, and means for moving said muff endwise, substantially as described.

5. A friction-clutch comprising two reversely-arranged rotary friction-cones arranged one inside the other and one of which is connected to a plate that is arranged at right angles to the axis of the clutch and is adapted to be moved endwise thereof, while the other cone is fixed in an endwise direction, a sleeve whereon said plate is mounted to move endwise, springs acting to press said endwise-movable cone against the other cone, driving-pins connecting said endwise-movable cone and sleeve, a muff arranged to slide endwise on said sleeve, diametrically-arranged antifriction-rollers arranged to act against the outer side of said plate, links jointed at one end to each roller and at their other ends to said sleeve and extending through said plate, other links jointed at one end to each roller and at their other ends to said muff, and means for moving said muff endwise, substantially as described.

6. In a friction-clutch having two concentric friction-cones, tubular rotary parts carrying said cones, and springs tending to force one cone into contact with the other, of a muff mounted to slide endwise on the rotary part carrying the endwise-movable cone, antifriction-rollers arranged to bear against a plate connected to said movable cone and arranged at right angles to the axis thereof, antifriction-rollers arranged to bear against the outer side of said plate, two sets of links jointed to said antifriction-rollers, one set extending through said plate and being jointed to the rotary part on which said plate moves endwise and the other set being jointed to said muff, and means for moving said muff endwise, substantially as described.

7. In a friction-clutch, the combination with two concentric friction-cones one of which has a constant tendency to move endwise toward the other and is connected to a plate arranged at right angles to the axis of the cones, and a sleeve to which said plate is connected so that it cannot rotate on said sleeve but can move endwise thereon, of the muff $v$ arranged to move endwise on said sleeve, the diametrically-arranged antifriction-rollers $p$ arranged to bear against the outer side of said plate, the pairs of links $r$ jointed to said rollers, extending through slots in said plates and jointed to lugs on said sleeve, the pairs of links $u$ also jointed to said rollers and to said muff, and means for moving said muff endwise on said sleeve, substantially as described.

8. The improved friction-clutch comprising the outer cone $e$ the wheel $g$ carrying said cone and provided with a boss $h$, the inner cone $a$ having a disk $b$ formed with roller-paths $o$ and slots $s$, the sleeve $c$ formed with the flange $k$ and whereon said disk can slide endwise, the coiled springs $l$ between said disk and flange, the driving-pins $n$ connecting said flange and disk, the muff $v$ arranged to slide endwise on said sleeve, the antifriction-rollers $p$ bearing against the roller-paths on said disk, the links $r$ jointed to said rollers, extending through said slots, and jointed to said sleeve within said cone $a$, the links $u$ jointed to said rollers and to said muff, and means for moving said muff endwise on said sleeve, substantially as described.

Signed at Sheffield, England, this 1st day of March, 1900.

JAMES REGINALD CHURCHILL.
FREDERICK GEORGE SEELEY.

Witnesses:
JAMES JOHNSTON,
FRANK M. CLARK.